United States Patent
Day et al.

(10) Patent No.: US 7,115,822 B1
(45) Date of Patent: Oct. 3, 2006

(54) INDIRECT ENTRY CABLE GLAND ASSEMBLY

(75) Inventors: Jonathan Day, Sheffield (GB); James Cotherman, Cranberry, PA (US); Sylvan Landers, Oil City, PA (US); Stanley J. Mason, Kennerdell, PA (US); David G. Thomas, Franklin, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 11/358,004

(22) Filed: Feb. 21, 2006

(51) Int. Cl.
*H02G 3/18* (2006.01)
(52) U.S. Cl. .................... 174/662; 174/665; 174/668; 248/56; 439/604; 16/2.1
(58) Field of Classification Search ............... 174/65 G, 174/65 SS, 151, 153 G, 135, 65 R, 662–665, 174/656, 667, 668; 248/56; 16/2.1, 2.2; 439/604
See application file for complete search history.

(56) References Cited

U.S. PATENT DOCUMENTS

| | | | | |
|---|---|---|---|---|
| 5,458,507 A | * | 10/1995 | Colescott et al. | ........... 439/589 |
| 6,150,607 A | * | 11/2000 | Weyl et al. | ............... 174/65 G |
| 6,768,058 B1 | * | 7/2004 | Pallapothu | ................ 174/65 G |
| 6,809,263 B1 | * | 10/2004 | Jackson | .................. 174/65 SS |
| 6,812,406 B1 | * | 11/2004 | Hand | ..................... 174/65 SS |
| 2004/0080119 A1 | * | 4/2004 | Goll | ........................... 277/607 |

* cited by examiner

Primary Examiner—Dhiru R. Patel
(74) Attorney, Agent, or Firm—James Earl Lowe, Jr.

(57) ABSTRACT

A cable gland assembly adapted to receive a cable and to pass through an opening in a sparking enclosure wall, the cable gland assembly including a cable-receiving gland, a stuffing box, a grommet, an insulator and a cable. The stuffing box has an opening there through, and a grommet-receiving portion having the grommet therein. The grommet-receiving portion is adjacent the cable-receiving gland. The stuffing box also includes a gas terminal portion filled with gas and adjacent the grommet-receiving portion, and an insulator portion having the insulator therein and being adjacent the gas terminal portion.

16 Claims, 2 Drawing Sheets

INDIRECT ENTRY CABLE GLAND ASSEMBLY

BACKGROUND OF THE INVENTION

This invention is directed to an assembly used to permit an electrical cable to enter a flameproof enclosure, and, more particularly, to indirect entry for electrical cables entering sparking enclosures rated greater than 250 watts and 5 amps.

Current indirect entry methods, as shown in FIG. 1, involve installing a chamber 11 on the outside of a flameproof enclosure 13, mounting electrical terminals 15 inside the chamber 11, and providing an insulated bushing 17 for each lead of every cable in the chamber that then enters through the walls of the enclosure 13. This is a very costly method of achieving indirect entry.

SUMMARY OF THE INVENTION

This invention provides a set of simple cable gland assemblies that address the requirements of existing standards. This series of assemblies is capable of handling cable diameters from 5.4 mm to 66.8 mm. Each cable passes through a direct entry gland, and then thereafter the cable conductors are separated in an inert gas or air chamber. The cable conductors are then encased in an insulated bushing before the conductors enter a flameproof sparking enclosure.

More particularly, this invention provides a cable gland assembly adapted to receive a cable and to pass through an opening in a sparking enclosure wall, the cable gland assembly including a gland nut, a stuffing box, a grommet, an insulator and a cable. The stuffing box has an opening there through, and a grommet-receiving portion having the grommet therein. The grommet-receiving portion is adjacent to the cable-receiving gland. The stuffing box also includes a gas terminal portion filled with gas and adjacent the grommet-receiving portion, and an insulator portion having the insulator therein and being adjacent the gas terminal portion.

The object of this invention is to provide a cable gland assembly that eliminates the need for welded on terminal chambers on sparking flameproof enclosures.

Another object of this invention is to eliminate the need to use separate cable glands to enter a welded terminal chamber, and to eliminate the need to use separate insulated bushings between the walls of the welded on terminal chamber and a flameproof enclosure.

Another object of this invention is to eliminate the large costs and size requirements necessary to meet the current indirect entry requirements of existing standards.

Figure 1:
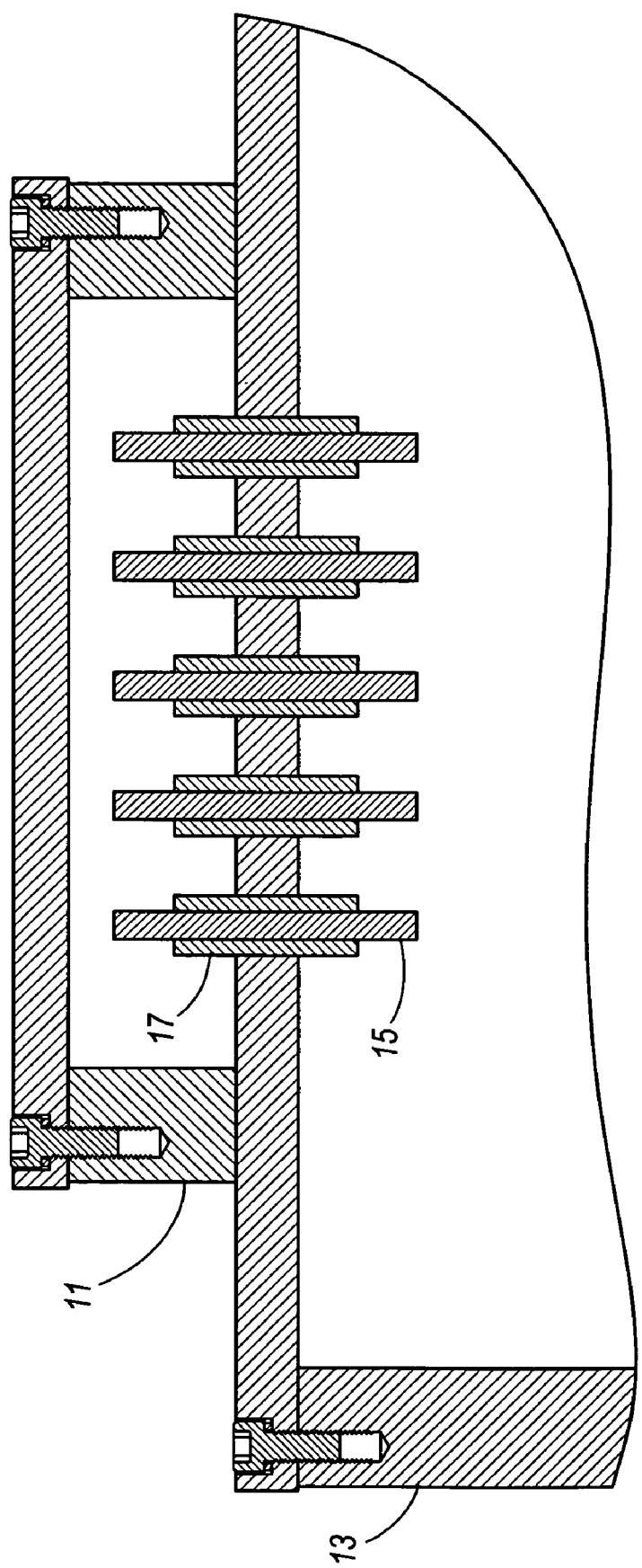
FIG. 1 is a cross section of a prior art sparking enclosure including a terminal chamber attached to the side of a flameproof enclosure.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience in reference to the drawings and are not to be construed as limiting terms.

DETAILED DESCRIPTION OF THE PREFERRED EMBODIMENT

This invention provides a small indirect entry cable gland assembly 10 capable of being fitted into a bore 14 in the wall 18 of a sparking flameproof enclosure 22 in order to provide an entry for a single conductor or multiple conductor cable 34 into the enclosure 22. The gland assembly 10 is designed to meet the previous Indirect Entry requirements of the International Standards (IEC60079-0 and IEC60079-1 series) for cables with diameters of 5.4 mm to 66.8 mm.

More particularly, as illustrated in the drawings, the cable gland assembly 10 includes a cable-receiving gland 42 having a gland nut 25, a gland nut housing or stuffing box 24, a grommet 26, an insulator 58 and the cable 34. The stuffing box 24 has an opening 38 there through. The cable-receiving gland 42 is adapted to receive the cable 34. The stuffing box 24 also has a grommet-receiving portion 46 having the grommet 26 therein, the grommet-receiving portion 46 being adjacent the cable-receiving gland 42. More particularly, the gland nut 25 is threaded and is received in a threaded opening in an end 27 of the grommet-receiving portion 46. Each of the cable-receiving gland 42 and the grommet-receiving portion 46 also has a flange, each with aligned openings 43 and 47 respectively that can receive a set screw or locking wire (not shown) to help restrain the cable-receiving gland 42 from turning relative to the grommet-receiving portion 46.

The gland assembly 10 further includes a brass grommet washer 86 between the grommet 26 and the cable-receiving gland 42. In other embodiments (not shown) the washer can be made of other materials such as steel, stainless steel, composite, etc. The grommet washer 86 permits sealed tightening of the cable-receiving gland 42 in the grommet-receiving portion 46. The stuffing box 24 also has a gas terminal portion 50 having a gas chamber 52 filled with gas and adjacent the grommet-receiving portion 46, and an insulator portion or compound chamber 54 having the insulator 58 therein, adjacent the gas terminal portion 50. The exterior of the stuffing box 24 around the insulator portion 54 is grooved. In the preferred embodiment, the insulator 58 is an epoxy compound, but in other embodiments, other insulators can be used.

More particularly, the gas is an inert gas, such as air. The grommet-receiving portion 46 is separated from the gas terminal portion 50 by a wall in the form of a disk 62 having a cable conductor passages there through. More particularly, the disk 62 is secured in the stuffing box opening 38, and the disk 62 has a plurality of spaced apart conductor holes 66

Figure 4:
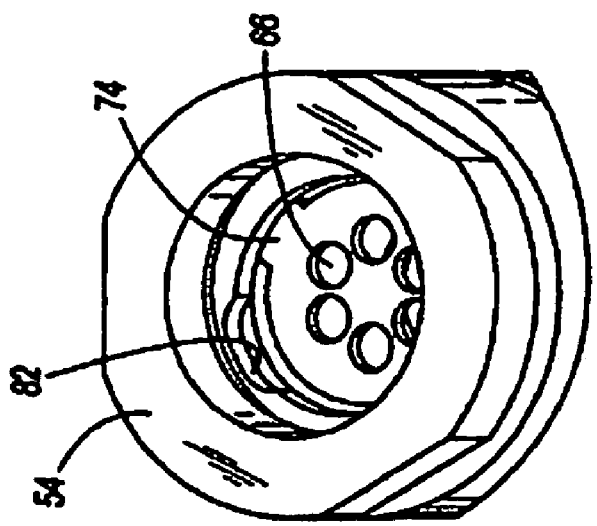
FIG. 4 is an enlarged perspective view of a compound chamber before it receives compound and a disk of the cable gland assembly.

(see FIG. 4). Each one 70 of the cable's conductors extends through a respective one of the disk holes 66.

Figure 2:
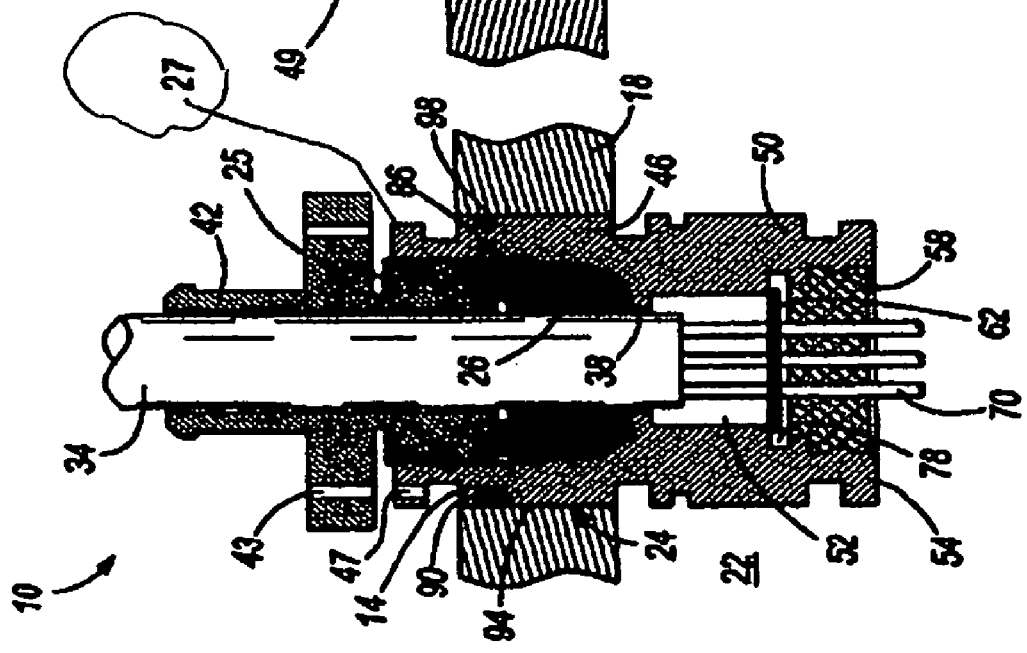
FIG. 2 is a cross sectional view of a cable gland assembly in accordance with this invention.

In the preferred embodiment, the disk 62 is generally circular and is secured in the stuffing box opening 38 by the disk 62 including a tab 74 extending radially from its outer circumference. The insulator portion 54 has a disk-receiving groove 78 (FIG. 2) therein. The disk-receiving groove 78 has a notch 82 (FIG. 4) therein adapted to receive the disk tab 74. The disk-receiving groove 78 is sized so that the disk 62 can be rotated so that disk tab 74 is no longer aligned with the disk tab notch 82 and the disk 62 is secured in the insulator portion 54 by being held in the disk-receiving groove 78.

The gland assembly 10 further includes a gasket 90, and the grommet-receiving portion 46 has an external surface 94 and a gasket-receiving groove 98 receiving the gasket 90. The gasket 90 in the stuffing box external surface 94 is adapted to be sealed between the enclosure wall 18 and the stuffing box 24.

Figure 3:
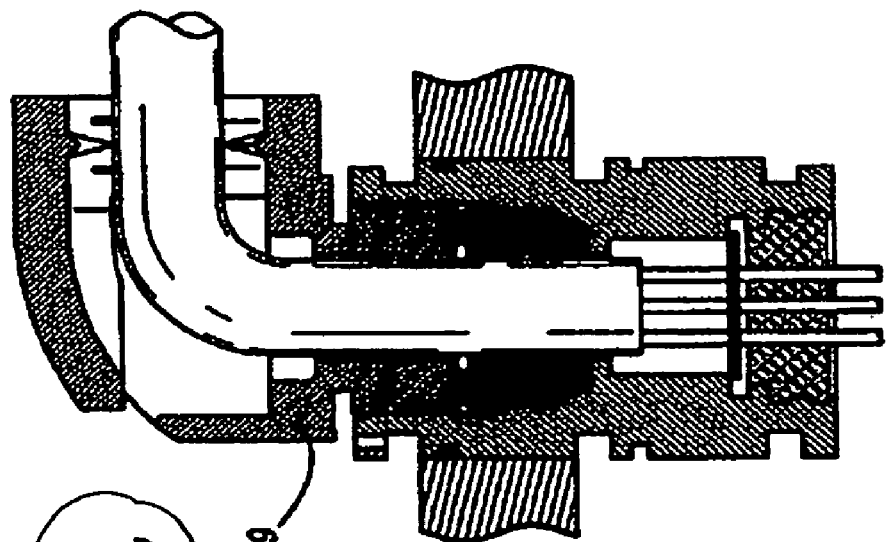
FIG. 3 is a cross sectional view of another cable gland assembly of the invention, this assembly incorporating a ninety degree bend in the cable.

In an alternate embodiment, as shown in FIG. 3, the cable gland assembly is the same except that the cable-receiving gland 49, instead of having a straight bore there through as in the first embodiment, has a curved 90 degree passageway there through. This permits the cable gland assembly to receive cables parallel to the enclosure wall 18, while the gland assembly of FIG. 2 receives cables from perpendicular to the enclosure wall 18.

The cable gland assembly, cable and flameproof enclosure are assembled as follows.

The cable is first prepared for assembly by removing its outer jacket. The cable is then inserted through the gland nut, grommet washer, grommet and stuffing box so that the cable jacket protrudes into the stuffing box to the disk. The conductor disk is then slide over the individual shielded conductors and the disk is inserted into the stuffing box by aligning the disk tab with the notch in the stuffing box. The conductors and disk are then rotated to insure the disk tab is secured in the stuffing box groove so that the disk is secured in the stuffing box. The cable-receiving gland is then rotated into the stuffing box until the cable-receiving gland reaches a recommended torque or minimum gap.

A set screw or locking wire to then used to secure the cable receiving gland 42. If an angle gland 49 is used, then the cable-receiving gland is not secured.

The compound chamber of the stuffing box is then filled with the compound.

In summary, the indirect entry gland assembly of this invention provides a global grommet gland, a terminal chamber, an easily insert-able conductor disk that separates the conductors of the cable, and an insulated bushing (epoxy).

Various other features and advantages of the invention will be apparent from the following claims.

The invention claimed is:

1. A cable gland assembly adapted to receive a cable and to pass through an opening in a sparking enclosure wall, the cable gland assembly including a cable-receiving gland adapted to receive said cable,
  a stuffing box, a grommet, and an insulator, said stuffing box having an opening there through, said stuffing box having an end releasably connected to said cable-receiving gland, a grommet-receiving portion having said grommet therein and being adjacent said cable-receiving gland, a gas terminal portion filled with gas and adjacent said grommet-receiving portion, and an insulator portion having said insulator therein and being adjacent said gas terminal portion.

2. A cable gland assembly in accordance with claim 1 wherein said gas is an inert gas.

3. A cable gland assembly in accordance with claim 2 wherein said inert gas is air.

4. A cable gland assembly in accordance with claim 1 wherein said grommet-receiving portion is separated from said gas terminal portion by a wall having a cable passage there through.

5. A cable gland assembly in accordance with claim 4 wherein said gas terminal portion is separated from said insulator portion by a disk secured in said stuffing box opening, said disk have a plurality of spaced apart conductor holes there through.

6. A cable gland assembly in accordance with claim 5 wherein said disk is generally circular and includes a tab extending radially from its outer circumference, and wherein said insulator portion has a disk receiving groove therein, said disk receiving groove having a notch therein adapted to receive said disk tab, said disk receiving groove being sized so that said disk can be rotated so that said disk tab is no longer aligned with said disk tab notch and said disk is secured in said disk receiving groove.

7. A cable gland assembly in accordance with claim 1 wherein said assembly further includes a washer between said grommet and said cable-receiving gland.

8. A cable gland assembly in accordance with claim 1 wherein said gland assembly further includes a gasket, and wherein said stuffing box has an external surface and further includes a gasket receiving groove receiving said gasket and being in the stuffing box external surface, said gasket adapted to be sealed between said enclosure wall and said stuffing box.

9. A cable gland assembly in accordance with claim 1 wherein said insulator is an epoxy compound.

10. A cable gland assembly adapted to receive a cable and to pass through an opening in a sparking enclosure wall, the cable gland assembly including a cable-receiving gland adapted to receive said cable,
  a stuffing box having an opening there through, a grommet, and an insulator, said stuffing box having an end releasably connected to said cable-receiving gland, a grommet-receiving portion having said grommet therein and being adjacent said cable-receiving gland, a gas terminal portion filled with an inert gas and adjacent said grommet-receiving portion, an insulator portion having said insulator therein and being adjacent said gas terminal portion, and a disk have a plurality of spaced apart conductor holes there through, said disk being secured in said stuffing box opening, and said gas terminal portion being separated from said insulator portion by said disk.

11. A cable gland assembly in accordance with claim 10 wherein said inert gas is air.

12. A cable gland assembly in accordance with claim 10 wherein said grommet-receiving portion is separated from said gas terminal portion by a wall having a cable passage there through.

13. A cable gland assembly in accordance with claim 10 wherein said disk is generally circular and includes a tab extending radially from its outer circumference, and wherein said insulator portion has a disk receiving groove therein, said disk receiving groove having a notch therein adapted to receive said disk tab, said disk receiving groove being sized so that said disk can be rotated so that disk tab is no longer aligned with said disk tab notch and said disk is secured in said disk receiving groove.

14. A cable gland assembly in accordance with claim 10 wherein said assembly further includes a washer between said grommet and said cable-receiving gland.

15. A cable gland assembly in accordance with claim 10 wherein said gland assembly further includes a gasket, and wherein said stuffing box has an external surface and further includes a gasket receiving groove receiving said gasket and being in the stuffing box external surface, said gasket adapted to be sealed between said enclosure wall and said stuffing box.

16. A cable gland assembly in accordance with claim 10 wherein said insulator is an epoxy compound.

* * * * *